Patented Aug. 25, 1953

2,650,201

UNITED STATES PATENT OFFICE 2,650,201

PRODUCTION OF PHOSPHORIC ACID CATALYST

Julian M. Mavity, Hinsdale, Ill., assignor to Universal Oil Products Company, Chicago, Ill., a corporation of Delaware No Drawing. Application October 2, 1950,
Serial No. 188,061

13 Claims. (Cl. 252—435)

This application is a continuation-in-part of my copending application Serial Number 122,596, filed October 20, 1949, and now abandoned.

This invention relates to the production of solid catalytic material useful in accelerating various types of reactions among organic compounds.

In a more specific sense, the invention is concerned with the production of a particular type of solid catalyst which has special properties both in regard to its activity in accelerating and directing olefin polymerization reactions, its stability in service, and in its relatively low corrosive properties when employed in ordinary commercial apparatus comprising various types of steel.

An object of this invention is a method of producing a hydrocarbon conversion catalyst which has a high resistance to crushing during use.

Another object of this invention is a highly active catalyst suitable for use in the polymerization of olefinic hydrocarbons and in other hydrocarbon conversion reactions involving olefins.

One specific embodiment of this invention relates to a process for improving the structural strength of a calcined composite of an acid of phosphorus and a solid supporting material which comprises treating said composite with a hydrolyzable compound of a metal selected from the group consisting of titanium, zirconium, and tin.

Another embodiment of this invention relates to a process for improving the structural strength of a calcined composite of an acid of phosphorus and a siliceous solid which comprises treating said composite with a hydrolyzable salt of a metal selected from the group consisting of titanium, zirconium, and tin.

A further embodiment of this invention relates to a process for improving the structural strength and activity of a calcined composite of a polyphosphoric acid and a siliceous adsorbent which comprises treating said composite with a hydrolyzable salt of titanium.

A still further embodiment of this invention relates to a process for improving the structural strength and activity of a calcined composite of a polyphosphoric acid and a siliceous adsorbent which comprises treating said composite with a hydrolyzable salt of zirconium.

An additional embodiment of this invention relates to a process for improving the structural strength of a calcined composite of a polyphosphoric acid and a siliceous adsorbent which comprises treating said composite with hydrolyzable salt of tin.

A still additional embodiment of this invention relates to a process for improving the structural strength and activity of a calcined composite of a polyphosphoric acid and diatomaceous earth which comprises treating said composite with stannic chloride.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases, is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given organic reaction as each of the catalysts produced from different acids and by slightly varied procedure will exert its own characteristic action.

When orthophosphoric acid is used as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the ortho-phosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures or to mixtures of other polyphosphoric acids and siliceous adsorbents may be different from that used when the ortho acid is so employed.

Triphosphoric acid which may be represented by the formula $H_5P_3O_{10}$ may also be used as a starting material for preparation of the catalysts of this invention. These catalytic compositions may also be prepared from the siliceous materials mentioned herein and a phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosporic anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1866 at a temperature of 60° F. However, it is unnecessary to crystalize the tetraphosphoric acid before employing it in the preparation of the solid catalysts inasmuch as the crude tetraphosphoric acid mixture may be incorporated with the siliceous adsorbent and other catalyst ingredient.

The materials which may be employed as adsorbents or carriers for acids of phosphorus include siliceous adsorbents such as diatomaceous earth, kieselguhr, artificially prepared silica, and also certain aluminum silicates which include such naturally occurring substances as various fuller's earths, clays, such as bentonite, montmorillonite, acid-treated clays, also refractory oxides, as alumina, magnesia, etc., carbon, and similar materials. Each adsorbent or supporting material which may be used will exert its own specific influence upon the final catalyst composite formed in the process.

Hydrolyzable compounds and particularly readily hydrolyzable salts of titanium, zirconium, and tin are useful for treating precalcined composites of a phosphoric acid and a carrier to improve the structural strength and catalytic activity of said composite. Such hydrolyzable salts of titanium, zirconium, and tin, include the halides, oxyhalides, nitrates, sulfates, and salts of organic acids. The halides include fluorides, chlorides, bromides and iodides. Some of these different hydrolyzable compounds of titanium, zirconium, and tin are either readily volatile at temperatures below about 350° C. or they have appreciable solubility in solvents including organic solvents such as saturated hydrocarbons, alkyl ethers, esters, alcohols, and also in water which may be regarded as an inorganic solvent. Examples of such hydrolyzable compounds are titanium tetrachloride, zirconium tetrachloride, and tin tetrachloride.

The treatment of a calcined composite of a phosphoric acid and a carrier with one or more of the aforementioned hydrolyzable compounds may be carried out by one of the following methods.

(1) The calcined composites may be maintained at a temperature of from about 100° to about 550° C. and contacted with vapors of said volatile compound or with a mixture of vapors of said volatile compound and a carrier gas such as nitrogen, helium, etc., which has no adverse reaction with the volatile compound.

(2) The calcined composite of a phosphoric acid and a carrier may be treated with a solution of the hydrolyzable compound of a metal selected from the group consisting of titanium, zirconium, and tin dissolved in a suitable solvent such as a low boiling saturated hydrocarbon, an ether, or another relatively low boiling organic solvent or in some cases with a solvent containing hydroxyl groups such as an alcohol and even water.

During this treatment of a calcined composite of a phosphoric acid and a carrier with a hydrolyzable compound of titanium, zirconium, or tin, the amount of said hydrolyzable compound is controlled so that the resultant treated phosphoric acid-containing catalyst will contain from about 1 to about 10% by weight of a phosphate of said titanium, zirconium, or tin so added in the form of the hydrolyzable compound to the solid catalyst forming a metal phosphate and thus increasing the structural strength of the treated catalyst.

Composites of a phosphoric acid and a carrier are prepared by mixing the phosphoric acid with the finely divided relatively inert carrier generally at a temperature of from about 20° to about 250° C. to form an aggregate in which the phosphoric acid is ordinarily the major proportion by weight. The resultant aggregate is a slightly moist to almost dry material which upon being compressed becomes sufficiently plastic so that it can be extruded and formed into shaped particles. The resultant particles are then dried and calcined at a temperature of from about 100° to about 550° C. for a time of from about 0.25 to about 10 hours to form a substantially solid material. The calcining operation may be carried out by heating the formed particles in a substantially inert gas such as air, nitrogen, flue gas and the like. These calcined particles are then composited with a hydrolyzable salt of titanium, zirconium, or tin as herein set forth.

A calcined composite of an acid of phosphorus and a carrier, particularly a siliceous carrier such as diatomaceous earth, is treated, for example, with stannic chloride vapors or with a mixture of vapors of stannic chloride and a substantially saturated hydrocarbon solvent. Alternatively, the particles of the calcined composite may be mixed with or soaked, for example, in a solution of stannic chloride dissolved in a suitable solvent. The treated composite may then be separated from the excess of the treating solution by decanting or distilling said solution or solvent therefrom after which the catalyst particles wetted with the solution of stannic chloride are heated in an inert atmosphere to remove excess solvent and also the remainder of the volatile tin compound to form a solid catalytic material with catalytic activity and structural strength greater than those of the calcined composite of a phosphoric acid and a carrier which was subjected to this treating step with stannic chloride in a hydrocarbon solvent.

Calcined composites of a phosphoric acid and a carrier, particularly, a siliceous carrier, which have been treated as herein set forth, with, for example, stannic chloride, titanium chloride or zirconium chloride, are active for promoting polymerization of olefinic hydrocarbons, particularly for promoting polymerization of normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

When the catalysts of this invention are utilized for promoting miscellaneous organic reactions, the catalysts may be employed in essentially the same way as they are used when polymerizing olefins, in case the reactions are essentially vapor phase, and they also may be employed in suspension in liquid phase in various types of equipment.

With suitable modifications in the details of operation, the present type of catalyst may be employed in a large number of organic reactions including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc., reactions involving the hydro-halogenation of unsaturated organic compounds, isomerization reactions, ester formation by the interaction of carboxylic acids and olefins, and the like. The specific procedure of utilizing the present type of catalysts in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose much of their activities during polymerization use and also suffer marked decrease in crushing strength due to the softening of the catalyst. Such softening of the catalyst also results in short catalyst life inasmuch as the catalyst towers become plugged during use. In this process, I have found that catalysts of high crushing strength may be produced by adding a hydrolyzable salt of titanium, zirconium, or tin to a composite of phosphoric acid and diatomaceous earth in which an amount of from about 1 to about 10% by weight (based upon the weight of total catalyst) of metal phosphate is formed in the final catalyst composite. Such a catalyst composite which has been treated with a tetrachloride of titanium, zirconium, or tin or with another readily hydrolyzable salt of such metals also has a good crushing strength after it has been used in polymerization of propylene or in the polymerization of other olefinic hydrocarbons.

The following examples illustrate the preparation of catalysts comprised within the scope of the invention and give results obtained in their use for catalyzing the polymerization of propylene, although the exact details set forth herein are not to be construed as imposing undue limitations upon the generally broad scope of the invention.

EXAMPLE I

Table I shows results obtained in an autoclave polymerization test on a catalyst prepared from phosphoric acid and diatomaceous earth which had been treated with 2% by weight of stannic chloride in pentane solution by the method described herein. The catalyst activity test was carried out by placing 10 grams of 5 x 5 mm. pellets of catalyst and 100 grams of a propane-propylene mixture (53.3% propylene content) in a rotatable steel autoclave of 850 cc. capacity which was then rotated at a temperature of 450° F. for 2 hours. At the end of this time, determination was made to indicate the percentage conversion of propylene into liquid polymers.

TABLE I

*Propylene polymerizing activities and crushing strengths of catalysts formed by treating a calcined composite of polyphosphoric acid and diatomaceous earth with stannic chloride*

| Run No. | Materials added to calcined composite of polyphosphoric acid and diatomaceous earth | Calcination | | Percent Conv. Propylene | Crushing strength, lbs. | |
|---|---|---|---|---|---|---|
| | | °F. | Hours | | Before Use | After Use |
| 1 | Stannic chloride | 680 | 1 | 81.8 | 15.6 | 10.2 |
| 2 | None | 680 | 1 | 66.5 | 11.4 | 5.4 |

An unexpected enhancement in activity was observed in the case of the catalyst treated with stannic chloride and later calcined at a temperature of 680° F. This particularly treated catalyst promoted polymerization of 81.8% of the propylene charged to the autoclave on comparison with 66.5% propylene polymerization effected in the presence of the original calcined composite of polyphosphoric acid and diatomaceous earth to which no stannic chloride has been added (run 2).

Also the after-use crushing strength of 10.2 pounds was better than the corresponding value of 5.4 pounds found in the case of the original catalyst which was not treated with stannic chloride.

EXAMPLE II

A calcined composite of polyphosphoric acid and diatomaceous earth like that referred to in Example I was also treated with aqueous solutions of zirconium tetrachloride as indicated hereinafter. Extruded 5 x 5 mm. pellets of solid phosphoric acid catalysts were treated with an aqueous solution containing 10% by weight of zirconium tetrachloride. These catalysts were prepared by soaking 54 grams of the solid phosphoric acid pellets with 5.9 grams of a solution produced by dissolving 2.7 grams of zirconium tetrachloride in 25 cc. of water. The wet pellets were dried for one hour at a temperature of 500° F. and divided into two portions; one portion of the treated pellets was calcined for one hour at a temperature of 680° F. and the other portion of the dried pellets was calcined for one hour at a temperature of 860° F.

Some of the commercially prepared solid phosphoric acid pellets were also treated with an aqueous solution containing 28% by weight of zirconium tetrachloride. In this treatment 54 grams of the solid phosphoric acid pellets were soaked with 11.4 grams of a solution prepared by dissolving 10.4 grams of zirconium tetrachloride in 28 cc. of water. The wet pellets were dried first at 500° F. for one hour and then one-half of the pellets was calcined for one hour at 680° F. and the other one-half was calcined for one hour at a temperature of 860° F.

Table II shows comparative results obtained in autoclave polymerization tests on these catalysts using propane-propylene mixture as the test gas by the procedure referred to in Example I.

TABLE II

*Propylene polymerizing activities and crushing strengths of catalysts formed by treating a calcined composite of polyphoric acid and diatomaceous earth with zirconium tetrachloride solution*

[Test conditions—10 grams of catalyst pellets, 100 grams of propane-propylene mixture containing 49.2 mole percent propylene maintained for 2 hours at a temperature of 232° C. in a rotating autoclave of 850 cc. capacity.]

| Run No. | Materials added to calcined composite of polyphosphoric acid and diatomaceous earth | Calcination | | ABD,[1] g./cc. | Percent Conv. Propylene | Crushing strength, lbs. | |
|---|---|---|---|---|---|---|---|
| | | ° F. | Hours | | | Before Use | After Use |
| 3 | Zirconium tetrachloride (10% solution) | 680 | 1 | 0.836 | 53.2 | 16.5 | 17.5 |
| 4 | do | 860 | 1 | 0.837 | 61.8 | 14.8 | 13.6 |
| 5 | Zirconium tetrachloride (28% solution) | 680 | 1 | 0.757 | 67.0 | 20.6 | 19.9 |
| 2[2] | None | 680 | | | 66.5 | 11.4 | 5.4 |

[1] Apparent bulk density.
[2] 53.3% propylene in test gas.

From Table II it is noted that the treatment of solid phosphoric acid catalyst pellets with an aqueous solution of zirconium tetrachloride improved the crushing strengths of the three catalyst samples so treated. Thus the after-use crushing strength of the zirconium tetrachloride treated catalysts was from 13.6 to 19.9 pounds in comparison with a value of 5.4 pounds found in the case of the original solid phosphoric acid catalysts which had not been treated with zirconium tetrachloride solution.

I claim as my invention:

1. A process for improving the structural strength of a calcined composite of an acid of phosphorus and a solid supporting material which comprises treating said composite with a hydrolyzable compound of a metal selected from the group consisting of titanium, zirconium, and tin in an amount sufficient to add from about 1 to about 10% by weight of a phosphate of said metal to said calcined composite, and further calcining the resultant composite to form a solid catalytic material of greater structural strength than that of the original calcined composite of phosphoric acid and solid supporting material.

2. A process for improving the structural strength of a calcined composite of an acid of phosphorus and a siliceous carrier which comprises treating said composite with a hydrolyzable compound of a metal selected from the group consisting of titanium, zirconium, and tin in an amount sufficient to add from about 1 to about 10% by weight of a phosphate of said metal to said calcined composite, and further calcining the resultant composite to form a solid catalytic material of greater structural strength than that of the original calcined composite of phosphoric acid and a siliceous carrier.

3. A process for improving the structural strength of a calcined composite of a polyphosphoric acid and diatomaceous earth which comprises treating said composite with titanium tetrachloride in an amount sufficient to add from about 1 to about 10% by weight of titanium phosphate to said calcined composite, and further calcining the resultant composite at a temperature of from about 100° to about 550° C. to form a solid catalytic material of greater structural strength than that of the original calcined composite of polyphosphoric acid and diatomaceous earth.

4. A process for improving the structural strength of a calcined composite of a polyphosphoric acid and diatomaceous earth which comprises treating said composite with zirconium tetrachloride in an amount sufficient to add from about 1 to about 10% by weight of zirconium phosphate to said calcined composite, and further calcining the resultant composite at a temperature of from about 100° to about 550° C. to form a solid catalytic material of greater structural strength than that of the original calcined composite of polyphosphoric acid and diatomaceous earth.

5. A process for improving the structural strength of a calcined composite of polyphosphoric acid and diatomaceous earth which comprises treating said composite with tin tetrachloride in an amount sufficient to add from about 1 to about 10% by weight of tin phosphate to said calcined composite, and further calcining the resultant composite at a temperature of from about 100° to about 550° C. to form a solid catalytic material of greater structural strength than that of the original calcined composite of polyphosphoric acid and diatomaceous earth.

6. A process for improving the structural strength of a calcined composite of pyrophosphoric acid and diatomaceous earth which comprises treating said composite with titanium tetrachloride in an amount sufficient to add from about 1 to about 10% by weight of titanium phosphate to said calcined composite, and further calcining the resultant composite at a temperature of from about 100° to about 550° C. to form a solid catalytic material of greater structural strength than that of the original calcined composite of pyrophosphoric acid and diatomaceous earth.

7. A process for improving the structural strength of a calcined composite of pyrophosphoric acid and diatomaceous earth which comprises treating said composite with zirconium tetrachloride in an amount sufficient to add from about 1 to about 10% by weight of zirconium phosphate to said calcined composite, and further calcining the resulant composite at a temperature of from about 100° to about 550° C. to form a solid catalytic material of greater structural strength than that of the original calcined composite or pyrophosphoric acid and diatomaceous earth.

8. A process for improving the structural strength of a calcined composite of pyrophosphoric acid and diatomaceous earth which comprises treating said composite with tin tetrachloride in an amount sufficient to add from about 1 to about 10% by weight of tin phosphate to said calcined composite, and further calcining the resultant composite at a temperature of from about 100° to about 550° C. to form a solid catalytic material of greater structural strength than that of the original calcined composite of pyrophosphoric acid and diatomaceous earth.

9. A process for improving the structural strength of a calcined composite of pyrophosphoric acid and diatomaceous earth which comprises treating said composite with titanium tetrachloride in an amount sufficient to add from 1 to about about 10% by weight of titanium phosphate to said calcined composite, and further calcining the resultant composite at a temperature of from about 100° to about 550° C. for a time of from about 0.25 to about 10 hours to form a solid catalytic material of greater structural strength than that of the original calcined composite of pyrophosphoric acid and diatomaceous earth.

10. A process for improving the structural strength of a calcined composite of pyrophosphoric acid and diamtomaceous earth which comprises treating said composite with zirconium tetrachloride in an amount sufficient to add from about 1 to about 10% by weight of zirconium phosphate to said calcined composite, and further calcining the resultant composite at a temperature of from about 100° to about 550° C. for a time of from about 0.25 to about 10 hours to form a solid catalytic material of greater structural strength than that of the original calcined composite of pyrophosphoric acid and diatomaceous earth.

11. A process for improving the structural strength of a calcined composite of pyrophosphoric acid and diatomaceous earth which comprises treating said composite with tin tetrachloride in an amount sufficient to add from about 1 to about 10% by weight of tin phosphate to said calcined composite, and further calcining the resultant composite at a temperature of from about 100° to about 550° C. for a time of from about 0.25 to about 10 hours to form a solid catalytic material of greater structural strength than that of the original calcined composite of pyrophosphoric acid and diatomaceous earth.

12. A solid catalytic material formed by treating a precalcined composite of polyphosphoric acid and diatomaceous earth with an amount of tin tetrachloride sufficient to add from about 1 to about 10% by weight of tin phosphate to said precalcined composite and further calcining the resultant composite at a temperature of from about 100° C. to about 550° C. for a time of from about 0.25 to about 10 hours.

13. A solid catalytic material formed by treating a precalcined composite of a phosphoric acid and a solid supporting material with a hydrolyzable compound of tin in an amount sufficient to add from about 1 to about 10% by weight of tin phosphate to said composite and calcining the resultant mixture at a temperature of from about 100° C. to about 550° C. for a time of from about 0.25 to about 10 hours.

JULIAN M. MAVITY.

References Cited in the file of this patent

UNITED STATES PATENTS

| Number | Name | Date |
|---|---|---|
| 2,496,621 | Deery | Feb. 7, 1950 |
| 2,569,092 | Deering | Sept. 25, 1951 |